United States Patent
Chatterjee et al.

(10) Patent No.: US 9,862,879 B2
(45) Date of Patent: Jan. 9, 2018

(54) EXTRUSION PROCESS FOR PROPPANT PRODUCTION

(71) Applicant: Halliburton Energy Services, Inc., Houston, TX (US)

(72) Inventors: Dilip K. Chatterjee, Houston, TX (US); Shanghua Wu, Houston, TX (US); Yuming Xie, Houston, TX (US); Christopher E. Coker, Houston, TX (US); Robert D. Skala, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 14/951,158

(22) Filed: Nov. 24, 2015

(65) Prior Publication Data
US 2016/0083645 A1  Mar. 24, 2016

Related U.S. Application Data

(62) Division of application No. 13/355,606, filed on Jan. 23, 2012, now Pat. No. 9,227,874.
(Continued)

(51) Int. Cl.
*C09K 8/80* (2006.01)
*B28B 11/00* (2006.01)
(Continued)

(52) U.S. Cl.
CPC .................. *C09K 8/80* (2013.01); *B28B 3/14* (2013.01); *B28B 3/20* (2013.01); *B28B 3/2636* (2013.01);
(Continued)

(58) Field of Classification Search
None
See application file for complete search history.

(56) References Cited

U.S. PATENT DOCUMENTS 3,112,184 A     11/1963  Hollenbach
3,874,207 A  *  4/1975   Lemelson ........................ 72/56
(Continued)

FOREIGN PATENT DOCUMENTS

CA    1117987 A2    2/1982
CN    1454765 A    11/2003
(Continued)

OTHER PUBLICATIONS

Russian Office Action for Application No. 201391073 dated Sep. 1, 2005.
(Continued)

*Primary Examiner* — John J Figueroa
(74) *Attorney, Agent, or Firm* — Craig W. Roddy; Tumey L.L.P.

(57) ABSTRACT

An extrusion method and apparatus are described for producing ceramics, glass, glass-ceramics, or composites suitable for use as proppants. The method includes forming one or more green body materials, extruding the green body materials to form a green body extrudate, separating and shaping the green body extrudate into individual green bodies, and sintering the green bodies to form proppants. The apparatus includes a means for forming an intimate mixture of green body materials, means to produce a green body extrudate, means for separating and shaping the green body extrudate into individual green bodies, and means to sinter the green green bodies to form proppants.

27 Claims, 6 Drawing Sheets

Related U.S. Application Data

(60) Provisional application No. 61/435,938, filed on Jan. 25, 2011.

(51) Int. Cl.

| | | |
|---|---|---|
| *B28B 11/24* | (2006.01) | |
| *B28B 13/02* | (2006.01) | |
| *B28B 3/20* | (2006.01) | |
| *B28B 3/14* | (2006.01) | |
| *B28B 3/26* | (2006.01) | |
| *B28B 7/34* | (2006.01) | |
| *B28B 17/00* | (2006.01) | |
| *B82Y 30/00* | (2011.01) | |
| *C04B 35/117* | (2006.01) | |
| *C04B 35/622* | (2006.01) | |
| *C04B 35/626* | (2006.01) | |
| *C04B 35/628* | (2006.01) | |
| *C04B 35/634* | (2006.01) | |
| *C04B 35/636* | (2006.01) | |

(52) U.S. Cl.
CPC ............ *B28B 7/342* (2013.01); *B28B 11/003* (2013.01); *B28B 11/24* (2013.01); *B28B 13/02* (2013.01); *B28B 17/0018* (2013.01); *B82Y 30/00* (2013.01); *C04B 35/117* (2013.01); *C04B 35/6224* (2013.01); *C04B 35/62213* (2013.01); *C04B 35/62231* (2013.01); *C04B 35/62236* (2013.01); *C04B 35/62263* (2013.01); *C04B 35/62695* (2013.01); *C04B 35/62802* (2013.01); *C04B 35/6365* (2013.01); *C04B 35/63408* (2013.01); *C04B 35/63432* (2013.01); *C04B 35/63464* (2013.01); *C04B 2235/36* (2013.01); *C04B 2235/528* (2013.01); *C04B 2235/5276* (2013.01); *C04B 2235/5284* (2013.01); *C04B 2235/5427* (2013.01); *C04B 2235/5436* (2013.01); *C04B 2235/6021* (2013.01); *C04B 2235/612* (2013.01); *C04B 2235/94* (2013.01)

(56) References Cited

U.S. PATENT DOCUMENTS

| | | | |
|---|---|---|---|
| 4,442,741 A | 4/1984 | Whittingham et al. | |
| 5,227,342 A | 7/1993 | Anderson et al. | |
| 5,251,523 A | 10/1993 | Fisher et al. | |
| 5,419,138 A * | 5/1995 | Anderson et al. | 62/605 |
| 7,160,584 B2 | 1/2007 | Goeb et al. | |
| 7,459,209 B2 | 12/2008 | Smith et al. | |
| 7,491,444 B2 | 2/2009 | Smith et al. | |
| 7,569,199 B1 | 8/2009 | Barron et al. | |
| 7,867,613 B2 | 1/2011 | Smith et al. | |
| 7,883,773 B2 | 2/2011 | Smith et al. | |
| 7,887,918 B2 | 2/2011 | Smith et al. | |
| 7,914,892 B2 | 3/2011 | Smith et al. | |
| 8,003,212 B2 | 8/2011 | Smith et al. | |
| 8,012,533 B2 | 9/2011 | Smith et al. | |
| 8,047,288 B2 | 11/2011 | Skala et al. | |
| 8,075,997 B2 | 12/2011 | Smith et al. | |
| 2002/0104419 A1 | 8/2002 | Williams | |
| 2003/0104238 A1 | 6/2003 | Rigali et al. | |
| 2004/0035270 A1 | 2/2004 | Williams | |
| 2005/0034581 A1 | 2/2005 | Bortone et al. | |
| 2008/0135245 A1 * | 6/2008 | Smith et al. | 166/280.2 |
| 2009/0003879 A1 | 1/2009 | Ishizuka | |
| 2009/0051063 A1 | 2/2009 | Stang et al. | |
| 2009/0288820 A1 | 11/2009 | Barron et al. | |
| 2010/0203336 A1 | 8/2010 | Shiao et al. | |
| 2011/0146985 A1 | 6/2011 | Xie et al. | |
| 2011/0160104 A1 | 6/2011 | Wu et al. | |

FOREIGN PATENT DOCUMENTS

| | | |
|---|---|---|
| CN | 1608732 A | 4/2005 |
| WO | 2009027841 | 3/2009 |
| WO | 2009/027841 | 5/2009 |
| WO | 2012078917 A2 | 6/2012 |

OTHER PUBLICATIONS

Chinese Office Action for Application No. 20120015668.2 dated Mar. 10, 2015.
European Search Report for European Application No. 12739256.1 dated Sep. 15, 2014.
Canadian Office Action for Canadian Application No. 2,824,761 dated Aug. 7, 2014.
International Search Report and Written Opinion for Application No. PCT/US2012/022147 dated Aug. 22, 2012.
USPTO Office Action for U.S. Appl. No. 13/355,606 dated Apr. 23, 2015.
Office Action for Canadian Patent Application No. 2,824,761 dated Feb. 25, 2016.

* cited by examiner

EXTRUSION PROCESS FOR PROPPANT PRODUCTION

BACKGROUND OF THE INVENTION

A variety of granular particles are widely used as propping agents to maintain permeability in oil and gas formations. Three grades of proppants are conventionally employed: sand, resin-coated sand, and ceramic proppants. Conventional proppants exhibit exceptional crush strength but also extreme density. A typical density of ceramic proppants exceeds 100 pounds per cubic foot. Proppants when used in oil and gas wells are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Proppants are principally used in gas wells, but do find applications in oil wells.

Relevant quality parameters, especially when proppants are used to enhance oil or gas production, include: particle density (low density is desirable), crush strength and hardness, particle size (value depends on formation type), particle size distribution (tight distributions are desirable), particle shape (spherical shape is desired), pore size (value depends on formation type and particle size, generally smaller is better), pore size distribution (tight distributions are desirable), surface smoothness, corrosion resistance, temperature stability, and hydrophilicity (hydro-neutral to phobic is desired). Lighter specific gravity proppants can be desirable, since they are easier to transport in the fracturing fluid and therefore can be carried farther into the fracture before settling out and which can yield a wider propped fracture than higher specific-gravity proppants.

Proppants used in the oil and gas industry are often sand and man-made ceramics. Sand is low cost and a moderate density compared to other proppant materials, but has low strength. Man-made ceramics, mainly bauxite-based ceramics or mullite-based ceramics, are much stronger than sand, but are far more dense and more costly than sand. Ceramic proppants dominate sand and resin-coated sand on the critical dimensions of crush strength and hardness. They also offer some benefit in terms of maximum achievable particle size, corrosion, and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Current ceramics proppants are typically employed in wells of intermediate to deep depth. Shallow wells typically employ sand or use no proppants. Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sand. First, resin coated sand exhibits higher crush strength than uncoated sand given that resin-coating disperses loads over a wider area, reducing stresses within the proppant. Second, resin-coated sands are "tacky" and thus exhibit reduced "proppant flow-back" relative to conventional sand proppants. In other words, the resin-coated sand proppant is more likely to remain in the formation. Third, the resin coating typically increases sphericity and roundness of the proppant, thereby reducing flow resistance through the proppant pack.

Recent developments in ceramic proppants have sought to maintain crush strength while reducing proppant density. As an example, porosity has been introduced into proppant bodies. The introduction of pores into proppant bodies have generally corresponded with reduced strength.

In each application of proppants to an oil or gas formation, some proppants are crushed. Porous ceramic proppants tend to generate significant amounts of fine particles which can be carried from the formation. Fines must be filtered and can abrade the equipment used during well production.

Ceramic proppants are typically formed using a standard series of processes:
1) Mix green body materials
2) Form green-body shape
3) Sinter green-body into final ceramic proppant.

Traditional processes to produce ceramic particles such as proppants are time consuming and costly. Raw materials are typically pre-ground to size. Then the sized materials are transferred to a mixer having medium to intensive shear in order to form a uniform dispersion or green body material. The green body material is then formed into particles by another process such as spray drying, compaction, or milling. The formation process may be repeated several times if a multi-layer ceramic particle configuration is desired. The stable, unsintered particle that is formed whether in a single or multi-layered process is called a "green body." Finally, the green body is sintered to produce a finished ceramic, glass-ceramic, or composite. The multiple steps in this process require many pieces of equipment, a large manufacturing area, and the need to transfer material from one piece of equipment to the next. Most of the steps in the traditional process are batch operations.

Extrusion processes are well known as methods to form ceramics. U.S. Pat. No. 3,112,184 describes a method to make thin-walled ceramic honeycomb structures for use in regenerators, recuperators, radiators, catalyst carriers, filters, heat exchangers, and the like. Such ceramic extrusions are useful for producing large, structural articles. U.S. Pat. No. 5,227,342 describes a method for making metal oxide ceramics, such as pellets or plugs, by an extrusion process. U.S. Pat. No. 7,160,584 describes a method for manufacturing a ceramic glow pin that is formed of more than two layers and manufactured by a co-extrusion process. Such ceramic extrusions can produce smaller shapes, such as pellets. However, these methods are not useful for articles, such as proppants, because proppants must be generally spherical in shape. When bisected by three mutually perpendicular planes, a sphere has a circular cross section in each plane. Extrusions can produce spherical cross sections in only one plane perpendicular to the direction of the extrudate as it exits the die. Furthermore, proppants with multiple layers must enclose or encapsulate the inner layers in the generally spherical proppant. In co-extrusions, multiple, adjacent layers, or regions are extruded simultaneously. If the extrudate from a coextrusion was cut perpendicular to the flow of material, inner layers or regions of material would not be completely encapsulated as all materials present in the coextrusion are visible in the extrudate when viewed in the direction perpendicular to the extruder die. Pellets cut from a coextrusion expose the inner layers of the structure at the surface where the pellet is cut.

SUMMARY OF THE INVENTION

A feature of the present invention is a process to produce a wide variety of ceramic particles suitable for use as proppants in a continuous and efficient manner.

A further feature of the present invention is a process capable of producing proppants with one or a plurality of material, layers, or regions.

A further feature of the present invention is the use of one or multiple green body materials, each associated with a layer, or region within the final proppant.

A further feature of the present invention is the use of a co-extrusion step where a plurality of green body materials come into contact and flow or move in substantially the same direction.

A further feature of the present invention is partial encapsulation of at least one material with another during a co-extrusion step.

A further feature of the present invention is the creation of higher density and lower density distribution green bodies.

A further feature of the present invention is the improvement of interfaces between multiple materials within green bodies.

A further feature of the present invention is the formation of proppants with a significantly narrower particle size distribution with respect to conventional proppants.

A further feature of the present invention is the ability to have the different layers or regions create a desired internal stress profile within the proppant bodies.

A further feature of the present invention is to provide a method for making strong, tough, and lightweight ceramics, glass or glass-ceramics matrix composites through a self-toughening structure generated by viscous reaction sintering of a complex mixture of oxides within at least one layer or region of a proppant.

A further feature of the present invention is to provide a multi-layer or multi-region ceramics, glass or glass-ceramics composite, such as in the form of a proppant, with superior crush strength.

A further feature of the present invention is to provide a proppant having a superior balance of crush strength and/or buoyancy as shown by specific gravity.

A further feature of the present invention is to provide a proppant that can overcome one or more of the disadvantages described above.

To achieve one or more features of the present invention, the present invention relates to a method to produce a material, such as a ceramic, glass-ceramic, or composite, by bringing multiple green body materials together into a stable multi-layered or multi-region arrangement in the form of a green body. The green body can be formed from several green body materials.

The method can include forming a green body from green body materials. The green body materials can include multiple mixtures of materials that can take the form of powders, slurries, pastes, liquids, and other forms. The materials in those mixtures can include one or more of the following classes of materials:

a) Sacrificial materials that can be at least partially removed during processing, from the green body or removed during sintering;
b) Ceramics, glass, or glass-ceramics;
c) Materials that form glass, glass-ceramics, ceramics, or ceramic precursors;
d) Materials that create pores in the sintered ceramic composite material;
e) Materials that enhance green body strength, such as binders;
f) Materials that enhance the rheology or flow of materials;
g) Materials that form phase interfaces in the finished ceramic, glass, glass-ceramics, or composites;
h) Materials that form whiskers, elongated grains, or fibers in the finished ceramic, glass, glass-ceramics, or composites; and/or
i) Materials that form separate particles embedded in the matrix of the sintered ceramic, glass, glass-ceramics, or composites.

The method can include an extrusion process to shape and form the green body material into a final shape suitable for a proppant or into an intermediate shape that can be subsequently transformed into a shape suitable for a proppant. Extrusion is accomplished by pushing or drawing the green body material through a die or other shaping device of the desired cross-section shape and size. The energy required to push or draw the green body material may be provided by a piston in a cylinder, a rotating screw in a cylinder, a twin rotating screw in co-linear cylinders, cylinder peristalsis, vibration, centrifugal forces, similar methods, or any combination thereof.

The method can include shaping the proppant subsequent to the extrusion to form the green body material into a final shape suitable for a proppant. The subsequent shaping may be accomplished by tumbling, rolling, grinding, milling, casting, die pressing, die forging, impingement, sand blasting, partial dissolving, and the like, or any combination thereof.

The method can include sintering the green body to produce a sintered ceramic, glass, glass-ceramic, or composite, such as a proppant. Sintering is accomplished with pressure or without pressure by increasing the temperature of the green body to effect inter-particle adherence in the green body. The required temperature increase for sintering may be produced by radiant heating, infra-red heating, plasma heating, microwaves, induction heating, RF heating, lasers, self-propagating combustion, and the like.

The present invention provides a process for making new and improved proppants that overcome the above-referenced problems and others. The proppant can be used in any application suitable for a proppant. The present invention accordingly relates to a method to prop open subterranean formation fractions using the proppant.

DETAILED DESCRIPTION OF THE PRESENT INVENTION

Figure 1:
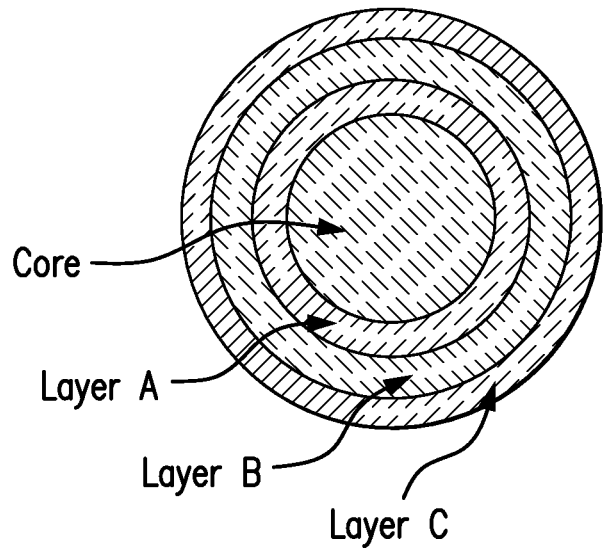
FIG. 1 illustrates a proppant produced by the method of the present invention. The figure represents a cross-sectional view of a multi-layer, spherical proppant. In this figure, the layers are illustrated as concentric spheres around a solid core.

The present invention relates to a process that includes preparing precursor ceramic, glass, glass-ceramic, or composite materials; combining precursor materials to form a green body material; bringing those materials together within an extrusion head, which can be a co-extrusion head; parting sections of the combined materials to form a green body; optionally altering the shape of the green body; and sintering the green body.

The process described herein, of the present invention can include one or more of the following steps:

1) 1) Mixing precursor materials to form a green body material;
2) 2) Providing materials to an extrusion chamber, such as a co-extrusion chamber, with appropriate forces and flow rates;
3) 3) Parting sections of the output from a chamber into discrete particles;
4) 4) Shaping the discrete particles into green bodies; and/or
5) 5) Sintering the green bodies into proppants.

The materials used to form the green body materials in the present invention can include one or more of the following:

6) Sacrificial materials that are at least partially removed during a process step;
7) Reactive materials that are involved in a chemical reaction, phase change, or other transformation during or after the process;
8) Riders: materials that are not changed during the process, but may undergo a surface bonding or other thin-layer effect during the process;
9) Pore-formers: materials that form pores in the proppant;
10) Flow Agents: materials that enhance the flow characteristics (including rheology, inter-particle friction and other characteristics) of a precursor, precursor mixture or green body material; and/or
11) Materials that perform more than one of the above functions.

Sacrificial materials in the present invention can include one or more of the following:

12) Styrene or other polymeric materials that are soluble in solvents such as toluene, xylene, and the like;
13) Low-ash, combustible materials such as starch, coke (petroleum or metallurgical), carbon, sugar, wood, plant spores, bacteria, and the like; and/or
14) Materials that are solid at room temperature, but have a boiling point below the sintering temperature such as water, waxes, oils, and the like.

Reactive materials in the present invention can include one or more of the following:

15) Alumina, silica, glass, clay, feldspar, metal oxides, silicon carbide, metals, mullite, bauxite, cordierite, metal carbides, metal nitrides, metal borides, metal silicides, and the like;
16) Materials that can react to produce fibers or whiskers such as silica, alumina, magnesium oxide, iron oxide, carbon, rice hulls, and the like;
17) Perlite, vermiculite, volcanic glasses and/or other glassy materials that contain chemically or physically bound water or other vaporizable material; and/or
18) Nephylene syenite and/or other fluxing materials that can form interfaces among phases in the proppant.

Riders, materials that remain substantially the same during the process, in the present invention can include one or more of the following:

19) Alumina, silica, glass, clay, feldspar, metal oxides, silicon carbide, metals, mullite, bauxite, cordierite, metal carbides, metal nitrides, metal borides, and/or metal silicides, and the like.

Pore and/or microsphere formers in the present invention can include one or more of the following:

20) Silicon carbide, silicon nitride, boron nitride, boron carbide, titanium carbide, titanium boride, aluminum nitride, sialon, and/or aluminum oxynitride, and the like.

Flow agents in the present invention can include one or more of the following:

21) Fumed silica, silicone, lubricants, gels, oils, water, and/or surfactants, and the like.

Appropriate flow (or material movement) and pressure (or force) can be delivered to the co-extrusion chamber described herein using one or more of the following methods, and/or combinations thereof:

22) Gravity, where the gravitational potential energy of a material is either increased or decreased to provide a desired material movement;
23) A rotating screw or twin screws and other shear-driven methods that may integrate a mixing function with desired material movement. Twin screws may be either co-rotating or counter-rotating;
24) Piston, ram and other positive displacement methods;
25) Peristalsis;
26) Vibration; and/or
27) Centrifugal forces and other inertial methods.

Figure 5:
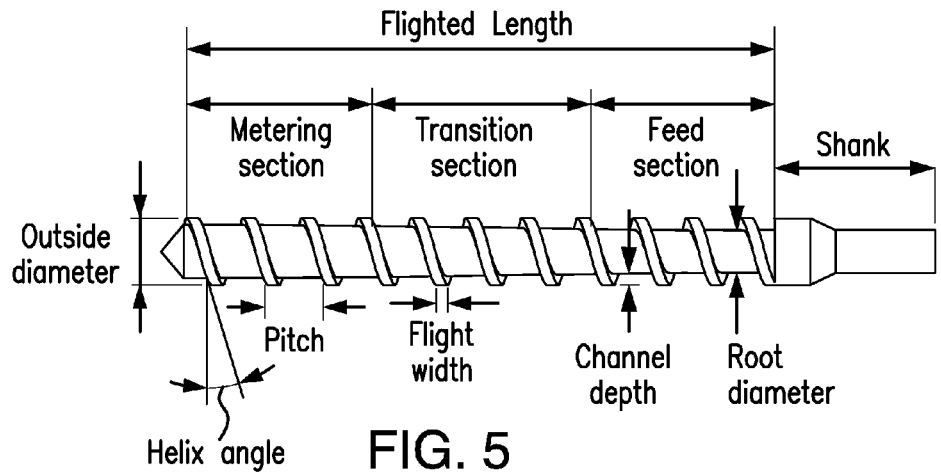
FIG. 5 shows a typical extruder screw design including feed, transition, and metering section. Extruder screw nomenclature is also shown.
Figure 6:
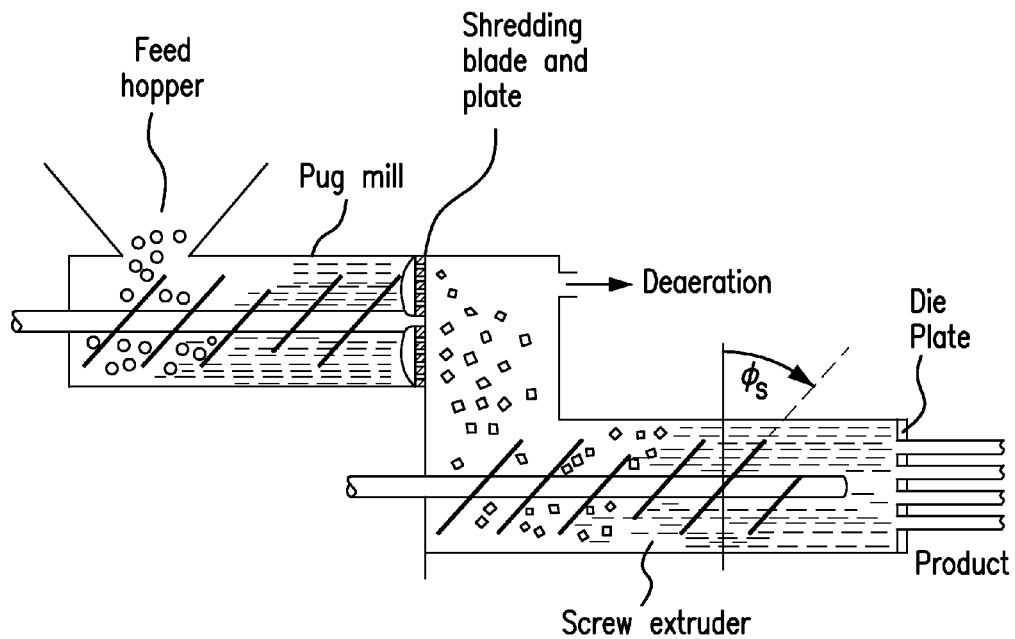
FIG. 6 shows a typical extruder design that allows for size control and reduction of incoming materials as well as mixing and metering of materials. The extruder can optionally comprise a feed hopper into which green body materials are fed. The feed materials can optionally be sized by a mill, such as a pug mill, shredding blade, grinder, bead mill, similar size reduction equipment, or any combination thereof. The extruder can optionally deaerate the green body materials and provide energy to mix the green body materials and force the green body materials through a die plate to form the desired cross sectional shape.

The methods of the present invention can comprise at least one extruder, such as shown in FIG. 6. The extrusion system can include a feed hopper through which ceramic, ceramic precursor, or other green body materials are fed. The ceramic, ceramic precursor, or other green body materials may optionally be reduced in size in one section of the extrusion process. Sizing may result from shear generated by the extruder screw or other milling device, such as a pug mill. The size reduction operation may further employ a liquid, such as water, to facilitate the size reduction process. A shredding blade and plate may be optionally employed to further reduce particle size. Liquids and vapors present or produced during the size reduction step may be optionally removed prior to further processing in the extrusion process. The extruder may employ a screw or screws as described in FIG. 5 for feeding, mixing, and/or metering green body material into the extrusion chamber and through a die plate. The extruder screw may have one or more sections, each with a specific purpose. The performance of each section is determined by screw design parameters, such as root diameter, channel depth, flight width, pitch, flighted length, helix angle, outside diameter, and/or other design parameters and by operating conditions, such as speed, temperature, pressure, and other settings. The extruder may employ a single screw or multiple screw design for processing a green body material. The extrusion process may employ multiple extruders, each processing different or the same green body materials that feed into an extrusion chamber.

Figure 3:
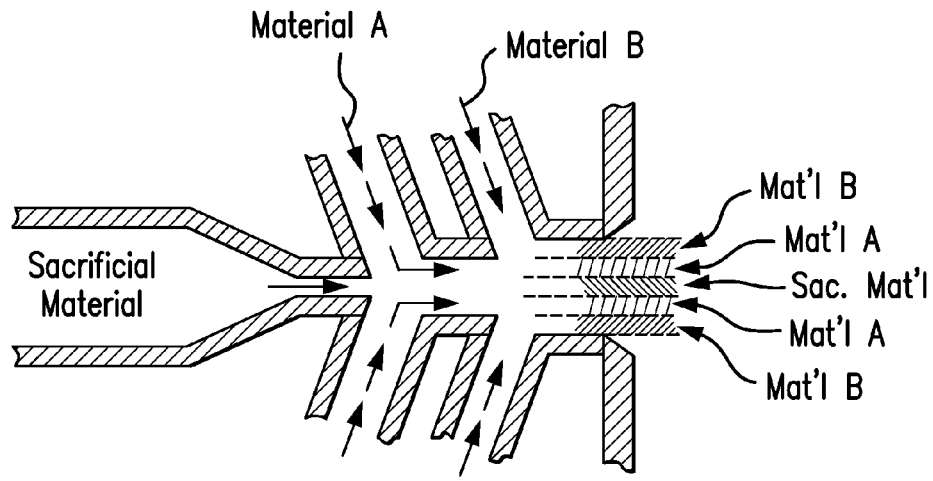
FIG. 3 illustrates a cross-section view of an annular extrusion chamber that includes a sacrificial material, Material A, and Material B. This figure shows a concentric flow or movement of three materials that is one possible arrangement of an extrusion chamber capable of bringing multiple materials together. As illustrated, Material A flows or moves toward the sacrificial material from all sides and touches the sacrificial material. Material B, similarly, moves toward Material A (after Material A has met the sacrificial material). Then, the three layers of material flow or move together in substantially the same direction. Generally, the viscosity of the materials is in centipoise (cps): sacrificial material (in cps)>Material A (in cps)>Material B (in cps).

The extrusion chamber (e.g., FIG. 3 and FIG. 4) in the present invention has a volume where a plurality of materials flow or move together in substantially the same direction. The cross section of this volume can be circular, oval, square, hexagonal, or any other shape. The flow or movement of the plurality of materials can be arranged to be concentric, parallel, offset, or can take another arrangement. The flow rates or mass flow rates of each green body material can be constant, discontinuous, reversing, periodic, or otherwise varying with time. The combined flow rate (or mass flow rate) can be constant, discontinuous, reversing, periodic, or otherwise varying with time. In addition, the mass flow rates of each precursor can be constant, discontinuous, reversing, periodic, or otherwise varying with time.

The co-extrusion chamber in the present invention includes at least one volume (e.g., space, flow path, flow area) for each single precursor material, wherein only that precursor material is stored, flows, or moves. Those volumes can be shaped to direct the flow or movement of each precursor in some combination toward and in parallel to other precursor materials. As one example, the flow or movement of a material in Region 2 in FIG. 4 would be radially toward the material in Region 1.

Figure 4:
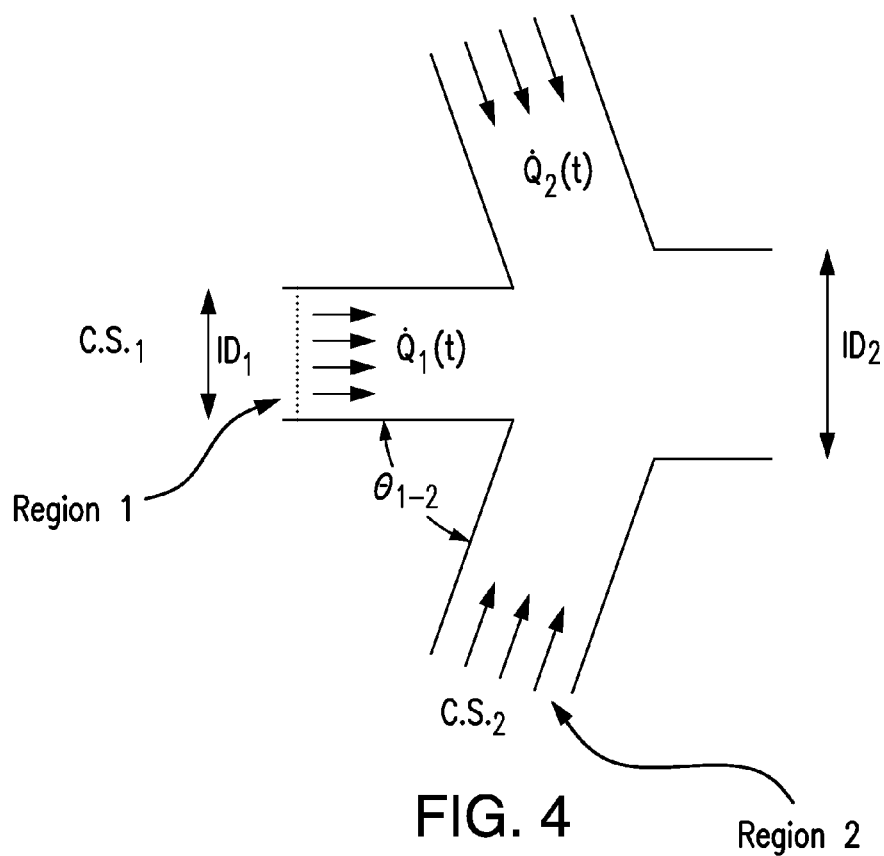
FIG. 4 illustrates a two-material extrusion chamber and several variables characterizing an extrusion chamber having, as illustrated in FIG. 3, concentric flows of multiple materials. Other co-extrusion designs can have different variables that those illustrated in this figure. In this figure, there is Region 1 (having a circular cross-section), where a first material enters the extrusion chamber and Region 2 (having a ring-shaped cross-section) where a second material enters the extrusion chamber. Associated with Region 1 are a diameter, $ID_1$, and a bulk flow rate, $\dot{Q}_1(t)$. The bulk flow rate can vary with time during the production of proppants. Region 2 has a more complex geometry, but does have a cross-sectional area, $CS_2$, and a bulk flow rate, $\dot{Q}_2(t)$. In addition, for this concentric arrangement, the angle between the flow within Region 2 and that within Region 1, $\theta_{1-2}$, can be selected to achieve the desired combined flow characteristics. Finally, the two materials flow or move together in a region having a diameter, $ID_2$, and length, $l_{12}$. While not illustrated in the figure, it can be advantageous to have a nozzle (decreasing diameter) or a diffuser (increasing diameter) integrated into or following this region in which both materials flow or move together.

When a co-extrusion method is used, such as shown in FIG. 4, as an option, the material that flows or moves from Region 2 has less viscosity (i.e., more fluid). Due to having a lower viscosity than the material in Region 1, this more fluid material will encapsulate or encircle the material from Region 1, thus forming an outer layer of material from Region 2. As an option, the material from Region 2 can create a gradient zone between the material from Region 1 and the material from Region 2. Put another way, the material of Region 2 can diffuse to various levels into the outer peripheral or region of the material from Region 1. The amount of diffusion can depend upon flow rates and viscosities of each material. For instance, such diffusion can result in a proppant with a core and at least one layer where the layer partly diffuses into the outer surfaces of the core to create a gradient of the two materials (core and layer). The same can occur between layers, when two or more layers are present. By having different viscosities of the two or more materials, one or more layers can be created and optionally the need for a complicated co-extrusion die can be avoided. The viscosity difference between the materials can be 1%, 5%, 10%, 25%, 50%, 75%, 75%, 100%, 150%, 200% (or more) with regard to viscosity (cps) of the materials, which are combined into the extrusion chamber. The viscosity of the inner material will generally be higher than the material that surrounds or encapsulates it to form a layer. For instance, viscosity (in cps) of the material in the extruder would be (referring to FIGS. 1 and/or 2): core>Layer A>Layer B (if present)>Layer C (if present)> and so on. The difference in viscosities, as provided above (number amounts), would be applicable to each material, and the difference can be the same or different from precursor material to precursor material forming the core and each layer.

The composition of the green body materials within any one or more volumes of the extrusion chamber can vary with time.

The shape of the volumes for each green body material, the flow rates of each green body material, and/or the flow rate of the combined green body materials contribute to a co-extrusion process wherein the cross section of the extrudate (output of the co-extrusion chamber) can vary with time. In a co-extrusion process, each green body material is made to occupy a certain region within the cross section of the extrudate. As an example, the width or cross-sectional area of the extrudate and/or the width or cross-sectional area of material regions, within the extrudate can be varied with time.

Figure 7:
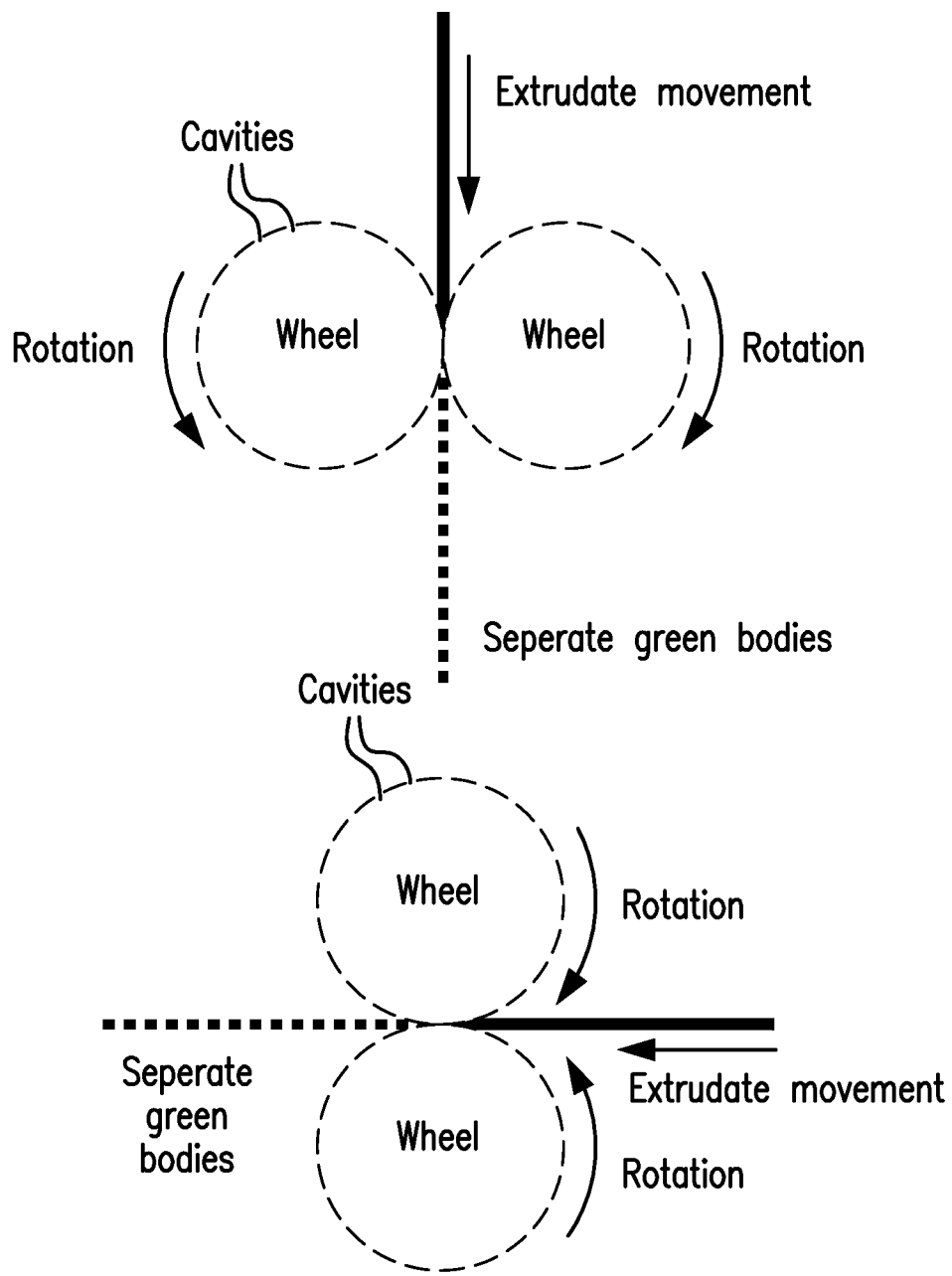
FIG. 7 shows two configurations (vertical and horizontal) of co-rotating wheels with cavities on the surface of the wheels that are used to separate extrudate into separate green bodies. The cavities may be semicircular, oval, triangular, irregular, or any other shape as desired.

In the present invention, green bodies can be formed by dividing the flow or material movement created in the co-extrusion chamber into discrete, disconnected units. The means of dividing the material movement or flow can include the following separately or in any combination:

1) A blade, edge, or other mechanical device brought into contact with the flow or movement of material;
2) A roller, belt, or other means of contacting the flow and supporting the movement of the disconnected units away from the co-extrusion chamber;
3) Pulses, varying flow, or continuous flow of air, water, or another fluid;

4) Changes in the flow or movement of the green body materials;
5) Vibration applied to any of the previously mentioned methods;
6) Solid surfaces with cavities or other structures that are brought into contact with the extrudate to perform at least a partial separation or shaping of the extrudate flow; and/or
7) Co-rotating wheels comprising solid surfaces with cavities or other structures that can at least partially separate or shape extrudate from the extrusion chamber as shown in FIG. 7.
8) A crimping device which can operate in the same manner as a moving blade or blades, except the edges are dull or rounded so as to create a crimping action to therefore create a green body or proppant that maintains a uniform or substantially uniform outer surface of the same material and, further, can maintain a uniform layered structure throughout the surface area of the green body or proppant.
9) Twisting or turning the flow of the green body exiting the extrusion head in order to twist the green material at certain time or space intervals to form a plurality of the same or similar green bodies in shape or size (e.g., in a systematic and consistent way) so as to cause a form of crimping.

The combination of varying extrudate cross sections and parting methods allows outer regions of extrudate to partially encapsulate or completely encapsulate inner regions. In other words, green bodies formed by the present invention can have inner extrudate layers that have limited or no exposure to the surface of the green body even after a parting and/or shaping operation.

Varying flow rates can also be used to increase the sphericity of green bodies, as assessed immediately after the parting operation. Without varying the combined flow rate, the green bodies would exhibit a roughly cylindrical shape.

The formation of green bodies in the present invention can include, in addition to the dividing or separating activity described above, shaping, coating, hardening, heating, and/or other processes that improve the process, improve the sintering process step or improve the features of the proppants.

The present invention further relates to other methods of making proppants which have a strengthened spherical structure with reduced defects. For instance, a slurry paste (e.g., ceramic slurry paste) can be forced under pressure through an extrusion die to form a green body extrudate, such as a cylindrical tube (e.g., hollow cylindrical tube), which is sectioned into predetermined lengths, for instance, by crimping, to form sectional green bodies (e.g., tube sections) which can have sealed ends, such as conical or hemispherical ends. The ends can be rounded off, such as by tumbling or other methods. The sectional green bodies or the resulting proppant can have one or more other layers.

Another method of the present invention for making the strengthened spherical particles can comprise an extrusion process wherein a slurry paste is forced under pressure through an extrusion die configured to form an extrudate which comprises a continuous cylinder shape which has a substantially cylindrical-shaped (or other shape) cross-sectional profile, and then intermittently crimping and dividing/cutting the tube to form discrete tube-shaped particles which have opposite crimped tube ends, and then tumbling the cut tube-shaped particles with crimped ends in a spheronizer to round off the cylinder ends to form a more spherical shaped hollow particle.

Figure 8:
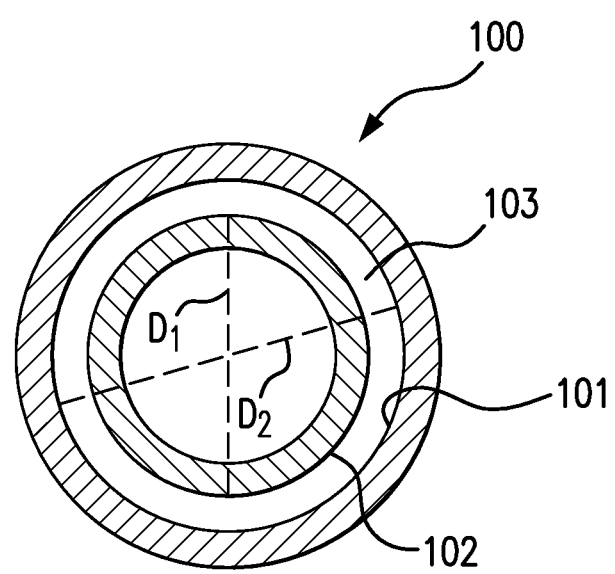
FIG. 8 is sectional view of an extrusion die which can be used for the extrusion of a cylindrical shaped extrudate from a slurry paste in accordance with at least one example of the present invention.

In an extrusion molding process of the present invention, a slurry paste can be forced under pressure through an extrusion die to form a hollow cylindrical-shaped tube of predetermined inside and outside dimensions. As shown in FIG. 8, an extrusion die 100 can be used which has inner and outer rigid cylindrical shaped wall structures 101 and 102 which define and enclose an intervening cylindrical or oval shaped slot 103 through which the slurry paste can be pumped or otherwise forced through under positive pressure to form a continuous cylindrical shaped extrudate. The shaped slot 103 has a cylindrical or oval shape in this illustration, and may have other shapes. The inner and outer dimensions of the extrudate can at least substantially correspond to the outer dimension $D_1$ of the inner wall 102 and the inner dimension $D_2$ of the outer wall 101 which define the extrusion die slot 103 through which the slurry paste is pumped under pressure. The outer dimension $D_1$ of the inner wall 102 can be, for example, from about 100 μm to about 300 μm, and the inner dimension $D_2$ of outer wall 101 can be, for example, from about 125 μm to about 1,000 μm, such has 350 μm to 1,000 μm. It is to be understood that $D_2$ is greater than $D_1$. The continuous hollow extrudate can be sectioned into pre-determined lengths, the length of which can be equal to the outside diameter of the tube formed, or other dimensions.

Figure 9A:
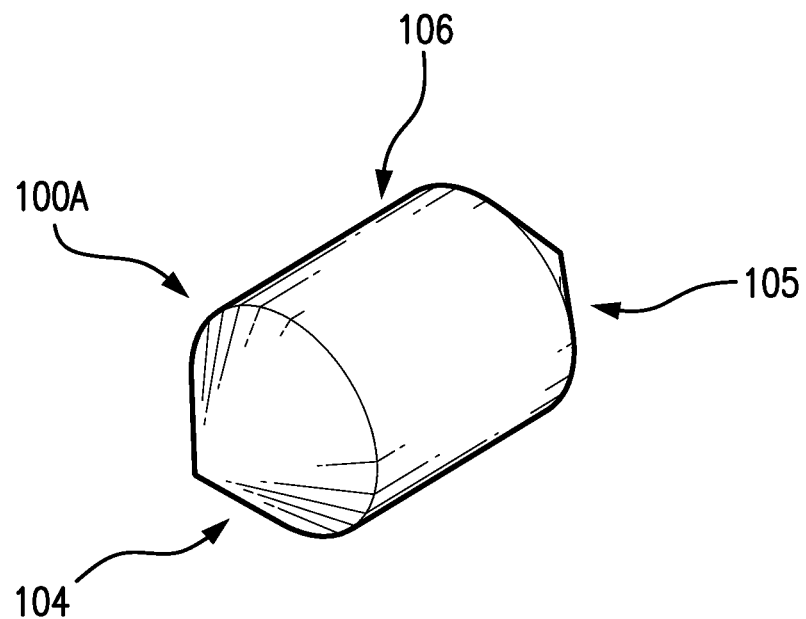
FIG. 9A is a perspective view which shows a crimped and cut extrudate tube with conical ends in accordance with at least one example of the present invention.
Figure 9B:
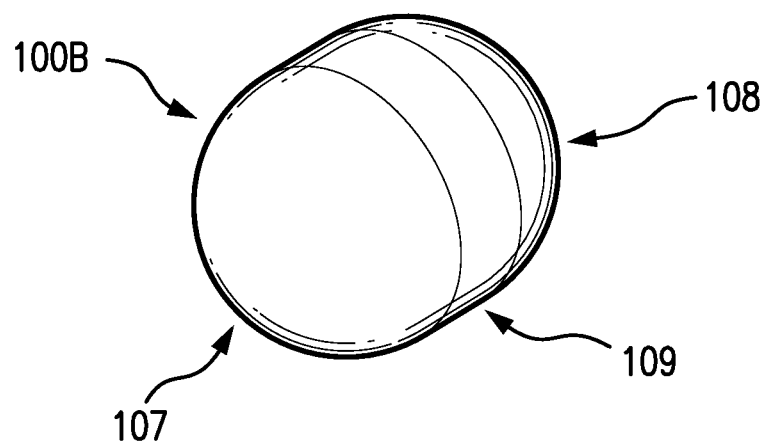
FIG. 9B is a perspective view which shows a crimped and cut extrudate tube with hemispherical ends in accordance with at least one example of the present invention.

In order to seal the ends on the tube (or any green body material exiting the extruder) prior to subsequent processing, the green body can be separated or cut via a crimping method, such as using a double acting crimping tool. The active faces of the crimping tool can have an included angle of about 90 degrees, and can form a conical section (or other shaped end) at the end of each section. FIG. 9A shows a crimped and cut extrudate 100A with opposite conical ends 104 and 105 and a hollow cylindrical middle section 106. The tube 100A with conical ends can have an overall end-to-end length ranging from about 1 to about 2 times the maximum outside diameter at the hollow middle section 106, or other values. The conical ends 104 and 105 each can have a length which is about 25% to about 100% the length of the middle section 106. Alternatively, the crimping tool may have a hemispherical profile to generate a spherical profile on the separated ends of the tube section. FIG. 11B shows a crimped and cut extrudate body 100B with opposite hemispherical ends 107 and 108 and a hollow cylindrical middle section 109. The tube 100B with hemispherical ends can have an overall end-to-end length ranging from about 1 to about 2 times the maximum outside diameter at the hollow middle section 109, or other values. The hemispherical ends 107 and 108 each can have a length which is about 50% to about 250% the length of the middle section 109. The use of a double acting crimping tool can ensure that the cut end faces of the tube sections (or any green body) are symmetrical about the central longitudinal axis of the tube. The use of a crimping action to cut the tube can also ensure sealing of the tube ends prior to a spheronization of the cut tubes, which can be used to form spherical hollow particles. The tube sections can be placed into a pan of a spheronizer, and the pan rotated to effect a randomized tumbling action of the tube sections leading to the cylinder ends being rounded off and a sphere formed. During the spheronization process, additional small volumes of water may be sprayed into the chamber to assist with the spheronization process and reduce any propensity of the tubes to crack or defects to form during the process. In addition, during the spheronizing process, additional components, such as metal oxide ceramics (alumina, magnesia, stabilized zirconias, mullite, transition aluminas such as boehmite and gibbsite, cordierite, spinel, titania, etc), metal nitrides and carbides (i.e. the nitrides and carbides of metals such as boron, titanium, silicon, aluminum, zirconium, etc), silicate based glass (aluminosilicates, zircon, perlite, pumice, titanium silicate etc), organometallics (tetraethyl orthotitanate, tetraethyl orthosilicate, aluminum isopropoxide, or a mixture of organometallics), fine metallic or intermetallic powders, ground naturally occurring materials (e.g. granite, basalt, gneiss, etc), optionally can be added to form a surface coating over the formed spheres to improve chemical durability, abrasion resistance, lubricity, strength and/or hardness, or act as a parting agent during sintering to prevent agglomeration of the individual spheres.

The spheronizer which is used can operate on conventional principles for such a device adapted for rounding off the ends of the described ceramic, glass, or metal oxide type extrudates. For example, the basic spheronizer machine can have a rotating friction disk, designed to increase friction with the product, which spins at high speed at the bottom of a cylindrical pan or bowl. The spinning friction disc can have a groove pattern on the processing surface. This is most often crosshatched, but several sizes and other types are available. After the cylindrical extrudate segments are separated or cut into segments, the extrudate segments can be charged to the spheronizer and fall on the spinning disc. These cylindrical segments are gradually rounded by the collisions with the bowl wall, the plate and each other. The ongoing action of particles colliding with the wall and being thrown back to the inside of the plate creates a "rope-like" movement of product along the bowl wall. The continuous collision of the particles with the wall and with the friction plate gradually turn the cylindrical segments into spheres, provided that the granules are plastic enough to allow the deformation without being destroyed. When the particles have obtained the desired spherical shape, the discharge valve of the chamber is opened and the granules are discharged by the centrifugal force.

The slurry paste which can be used for the die extrusion process can comprise, for example, ceramic powder particles with sizes which can range from about 0.5 µm to about 3 µm, and specifically from about 1 µm to about 2 µm, or other sizes, mixed with a carrier fluid. The carrier fluid can be water, but may also include organic solvents, such as acetone, methanol, ethanol, and the like. Binders can be added to the slurry that allow the paste to maintain its shape after extrusion and provide enough strength to the extrudate during the crimping and spheronization processes. These binders can include paraffin wax, poly vinyl alcohol, poly methylmethacrylate, polyethylene glycol, methyl cellulose, hydroxyl propyl methyl cellulose, and any combinations thereof. In addition to the binders and carrier fluid, an optional lubricant may be added to assist with paste flow in the barrel of the extruder and in the extrusion die. These lubricants can include stearic acid, phthalic acid, oleic acid, petroleum oil, polyacrylamide, menhaden fish oil, and any combinations thereof. The resulting paste can be admitted to the barrel of an extruder and forced under pressure to the extrusion die assembly. Following the formation process, the green ceramic proppant particles can be subjected to a heat treatment cycle to bring about such processes as de-binding, and sintering.

In a further extension of the extrusion process, multiple layers of differing compositions can be simultaneously extruded through a co-axial extrusion die set to form extrudate with a layered or multi-layered structure, followed by the crimping and spheronization processes. This can yield spherical proppant particles with a layered or laminated structure which can confer additional strength, toughness and durability properties on the proppant particles. These described injection and extrusion molding processes can also be used to make template particles which can be employed in template coating processes described herein to form spherical, light weight, high strength proppant particles.

Regarding extrusion processes, in the past, the extrudate was simply cut to expose the cross-sectional area of the ends. For instance, Bortone et al. (U.S. Patent Application Publication No. 2005/034581) relates to the use of a cutting assembly for extruded materials using counter-rotating rollers with planar blades fitted to the periphery at predefined locations. Rotation of the rollers causes a cutting action to occur by way of shearing that yields cut faces of the extrudate that are more or less perpendicular to the axial direction of the extrudate. Whittingham et al. (U.S. Pat. No. 4,442,741) relates to the use of a pretensioned music wire assembly for the cutting of a minced meat extrusion, with the cutting action able to be completed on both the downward and upward strokes of the cutting wire. Again, the cut faces of the extrudate are essentially perpendicular to the axial direction of the extrudate. Fisher et al. (U.S. Pat. No. 5,251,523) takes the cutting action one step further and shows the use of a pair of cutting die bushings fitted with a thin planer blade to cut extruded plastic. The use of a rotating cutting apparatus has been described by Williams (U.S. Patent Application Publication No. 2002/0104419 and U.S. Patent Application Publication No. 2004/0035270), wherein a multiplicity of planar cutting blades are fitted to the surface of rotating cylinder, cutting action occurs by a shear mechanism. For the present invention, these cutting techniques would not work, but instead, a crimping operation would be needed when making a proppant that comprises a core and layer or a proppant with multi-layers. The above references can be modified as follows.

The mechanism of the present invention for dividing the extrudates to pre-determined lengths occurs not by shear, but, for instance, by localized compression of the extrudate between profiles blades. The profile of the blades (or dividers) may be shaped such that conical, inclined, hemispherical, or wedged shaped ends are generated by the dividing action. In other words, the dividing method of the present invention provides the separating and forming of the plurality of extrudate ends in a one step operation, and is particularly useful for achieving a uniform or substantially uniform outer surface with respect to material consistency and can be useful for the sealing of tubular or hollow extrudates during the separating/dividing operation.

The expression "reactive sintering" as used herein, can include a process wherein heat is applied to a composition, causing that composition to undergo, at least in part, a chemical reaction forming a new composition. The composition is heated to below or about its melting point.

The term "green body" or "green pellet" refers to pre-sintered material of this invention that has been shaped from the disclosed compositions but is not sintered. The mixing step typically provides an aqueous dispersion or paste, which is later dried.

The sintering of the green body can occur at any temperature to achieve densification of the material forming the green body, which can include ceramic material or oxides thereof. Sintering temperatures can be, for instance, from 700° C. to about 1,700° C., or from about 800° C. to about 1,700° C. Sintering can occur by ramping up to the desired temperature. The sintering temperature is the temperature in the oven or sintering device. The green body or parts thereof can include one or more sintering aids, grain growth inhibitors, ceramic strengthening agents, glassy phase formation agents, crystallization control agents, and/or phase formation control agents. The various processes and/or materials used to form the green bodies or proppants, or post-processing steps as described in U.S. Pat. Nos. 8,075,997; 8,047,288; 8,012,533; 8,003,212; 7,914,892; 7,887,918; 7,883,773; 7,867,613; 7,569,199; 7,491,444; and 7,459,209 can be used and these patents are incorporated in their entirety by reference herein and form a part of the present application.

Furthermore, for purposes of the present application, it is understood that the shape of the proppant can be any shape, and the extrusion chamber and/or die can essentially be configured to any desired shape in order to achieve the desired proppant shape, which can be spherical, non-spherical, cylindrical, irregular, or other geometric shapes that are desirable depending upon the user's specifications.

The extrusion rate can range from 0.5 mm/min to 500 mm/min or more, or any range within these limits. The moisture content of the extrusion paste may range from 5 wt % to 20 wt % or more, such as from 5 wt % to 10 wt %. The polymeric components (binder, lubricants, dispersants, wetting agents, viscosity modifiers, defoamers, etc.) (if present) can be present in the extrusion paste(s) in an amount of from 0.5 wt % to 15 wt % or more, such as from 2 wt % to 8 wt %. The paste may be a thixotropic or rheopectic plastic non-Newtonian paste with viscosities that may range from 100,000 cP to 10,000,000 cP or more, such as from 120,000 cP to 1,000,000 cP. All weight percents provided herein are based on the total weight percent of the extrusion material or paste. Generally speaking, the amounts of one or more of the various ingredients can optionally be in the amount(s) set forth above in the identified patents, which are incorporated herein by reference.

For purposes of the present invention, the material of the present invention will be described in terms of its preferred form or shape, in terms of bodies with multiple layers or regions and namely particles that can be used in a variety of end use applications, such as for proppant uses in hydrocarbon recovery. While the preferred shape and preferred materials of the present invention are described in detail herein, it is to be understood that this is simply for exemplary purposes and in no way limits the scope of the present invention with respect to shape, materials, and/or end uses. While the term "proppant" is used at times in the application, it is understood that this term is not meant to be limited to its end use application, but for purposes of the present invention, it is to be understood that the proppant or particles, which are used as proppants, can be used in any end use application where ceramic, glass, glass-ceramics, or composites are useful.

The proppant produced by the method of the present invention may produce a solid proppant as shown in FIG. 1. The proppant may include one or more layers. The proppant may comprise a core only with no layers around the core. FIG. 1 shows a proppant with a core and three layers, but less than or more than three layers may be present. The core and each layer may be of the same or different size, shape, and/or green body material. The materials in the core and each layer may be uniformly dispersed, partially dispersed, or discrete. The core and/or one or more layer(s) may include pores, which can be the same or differing size, size distribution, and/or shape. The core and/or one or more layer(s) may include embedded objects, such as microspheres and/or other objects. The layers or regions in the proppant bodies can be distinct based on compressive strength, density, material composition, porosity, pore size, pore size distribution, pore shape, sintering behaviors, internal stresses (in a loaded or unloaded condition), thermal conductivity, thermal expansion coefficients, and/or other properties. The interface between the core and layers and between individual layers may be diffuse without a clear boundary separating the layers, such that there is a transition region between layers, or the interface can be a clear district boundary.

Figure 2:
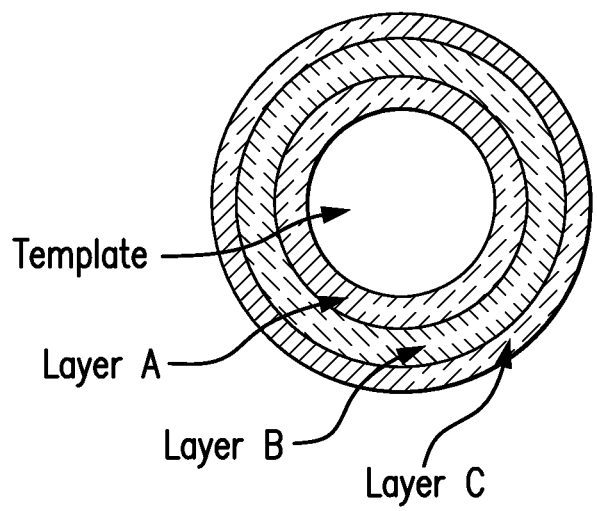
FIG. 2 illustrates a proppant produced by the method of the present invention. The figure represents a cross-sectional view of a multi-layer, spherical proppant. In this figure, the layers are illustrated as concentric spheres around a hollow template.

The proppant produced by the methods of the present invention can, as an option, produce a solid proppant with a hollow core as shown in FIG. 2. The proppant may include one or more layers. FIG. 2 shows a proppant with a hollow core and three layers, but more or less than three layers may be present. The hollow core may be formed in situ (e.g., by use of a sacrificial material or pore precursor, or by the use of a die head that extrudes a hollow core) or it may be formed by a template, such as a cenosphere. Each layer may be of the same or different size, shape, and/or green body material. Each layer may include more than one type of green body material. The materials in each layer may be uniformly dispersed, partially dispersed, or discrete. Each layer may include pores and/or microspheres of differing size, size distribution, and/or shape. Each layer may include embedded objects, such as microspheres or other objects. The layers or regions in the proppant bodies can be distinct based on compressive strength, density, material composition, porosity, pore size, pore size distribution, pore shape, sintering behaviors, internal stresses (in a loaded or unloaded condition), thermal conductivity, thermal expansion coefficients, and/or other properties. The interface between the core and layers and between individual layers may be distinct or may be diffuse without a clear boundary separating the layers such that there is a transition region between layers.

In accordance with the methods of the present invention, the ceramic proppant produced as described herein may be used as proppants, gravel, or fluid loss agents in hydraulic fracturing, and/or frac packing. As stated above, the present invention also relates to a proppant formulation comprising one or more proppants of the present invention with a carrier. The carrier can be a liquid or gas or both. The carrier can be, for example, water, brine, hydrocarbons, oil, crude oil, gel, foam, or any combination thereof. The weight ratio of carrier to proppant can be from 10,000:1 to 1:10,000, or any ratio in between, and preferably about 0.1 g proppant/liter fluid to 1 kg proppant/liter fluid.

For the purposes of the present invention, the processes will now be described in terms of the preferred materials, preferred process steps, and the preferred process output, namely proppants. While the preferred steps, their preferred arrangements, set ups, operating conditions, geometries, control methods, and other conditions, variables and options are described herein, it is to be understood that this description is offered for exemplary purposes and in no way limits the scope of the present invention with respect to specific process steps, their arrangement, set up, operating conditions, geometries, control methods, and other conditions, variables, or options.

The ceramic, glass, glass-ceramics, or composites of the present invention can be in the form of a sphere, where the sphere is solid or hollow, or has one or more voids present within the sphere. The ceramic, glass, glass-ceramics or composites can be a sphere or similar shape, and can be hollow in the interior of the sphere.

As an option, the material of the present invention can form a shell around one or more other materials, such as a template or template material, which can be in the form of a sphere or other shape and which can be a solid material or a hollow material. For instance, the material of the present invention can form a shell around a hollow sphere, such as a cenosphere or other similar material. When the ceramic, glass, glass-ceramic, or composite of the present invention is present as a shell and encapsulates one or more other materials, such as a sphere (like a hollow sphere), the coefficient of thermal expansion between the shell and the template material can be the same or within 20% of each other, such as within 10%, within 5%, within 1%, or within 0.5% of each other.

The proppant (or sintered body) can have a hollow core or a solid core, and can have a low specific gravity, for example, a specific gravity in a range of from about 1.0 g/cc to about 2.5 g/cc, while maintaining a crush strength in a range of from about 500 psi to about 20,000 psi, and/or a flexural strength in a range of from about 1 MPa to about 200 MPa, or more.

The multi-layer or multi-region proppants of the present invention provide oil and gas producers with one or more of the following benefits: improved flow rates, enhanced hydrocarbon recovery, improved productive life of wells, improved ability to design hydraulic fractures, and/or reduced environmental impact. The proppants of the present invention are designed to improve flow rates, eliminating or materially reducing the use of permeability destroying polymer gels, reducing pressure drop through the proppant pack, and/or reducing the amount of water trapped between proppants thereby increasing hydrocarbon "flow area." Lower density enhances proppant transport into the formation, which increases the depth proppants can penetrate the formation from the well bore. This effect increases the amount of fracture-area propped, and thereby the mechanical strength of the reservoir. The low density of the present invention's proppants can reduce transportation costs. Because the proppant is lighter, less pumping force is needed, potentially lowering production costs and reducing damage to the formation.

The multi-layer structure of the present invention enables the production of proppants with a variety of beneficial property improvements which can include, but are not limited to, lower production cost, improved "flow-back" and lower particulate generation upon crushing within the formation.

Proppants of the present invention preferably enable the use of simpler completion fluids, which can be of a lower cost, and require slower or otherwise less destructive pumping. Formations packed with the lower density proppants of the present invention can exhibit improved mechanical strength/permeability and thus increased economic life. Enhanced proppant transport enabled by lower density proppants enable the placement of the proppant of the present invention in areas that were previously impossible, or at least very difficult to prop. As a result, the mechanical strength of the subterranean formations can be improved with reduced decline rates over time.

If lower density proppants are employed, water and/or brine solutions can be used in place of more exotic completion fluids. The use of simpler completion fluids can reduce or eliminate the need to employ de-crosslinking agents. Further, increased use of environmentally friendly proppants can reduce the need to employ other environmentally damaging completion techniques such as flashing formations with hydrochloric acid. The low density properties that can be exhibited by the proppants of the present invention eliminates or greatly reduces the need to employ permeability destroying polymer gels as the proppants are more capable of staying in suspension.

The present invention relates to low density proppants that can be utilized, for example, with water and/or brine carrier solutions.

The proppant can be either solid throughout or hollow within the proppant. In the present invention, a solid proppant is defined as an object that does not contain a void space in the center, although a porous material would be suitable and is optional; a fully dense material is not a requirement of a solid proppant. A hollow material is defined as an object that has at least one void space inside (e.g., generally centrally located within the proppant) with a defined size and shape.

The ceramic, glass, glass-ceramics, or composites of the present invention can have isotropic properties and/or anisotropic properties. In other words, the ceramic, glass, glass-ceramics, or composites can have measurable properties that are identical in all directions (isotropic), or can have properties that differ according to the direction of measurement (anisotropic).

The template or extrusion chamber openings can have a diameter in the size range of, for example, from about 1 nm to about 3000 μm, or from about 25 μm to about 2000 μm, or from about 80 μm to about 1500 μm, or from about 120 μm to about 300 μm, or from about 250 μm to 600 μm.

The proppants of the present application can have a specific gravity of, for example, from about 0.6 g/cc to about 3.5 g/cc. The specific gravity can be, for example, from about 2.0 g/cc to about 2.5 g/cc, from about 1.0 g/cc to about 2.5 g/cc, from about 1.0 g/cc to about 2.2 g/cc, from about 1.0 g/cc to about 2.0 g/cc, from about 1.0 g/cc to about 1.8 g/cc, from about 1.0 to about 1.6 g/cc, or from about 0.8 g/cc to about 1.6 g/cc. Other specific gravities above and below these ranges can be obtained. The term "specific gravity" as used herein is the weight in grams per cubic centimeter (g/cc) of volume, excluding open porosity in determining the volume. The specific gravity value can be determined by any suitable method known in the art, such as by liquid (e.g., water or alcohol) displacement or with an air pycnometer.

The strength properties of the proppant can be dependent on the application. It is intended that a crush strength of at least 1,000 psi is desirable. The crush strength can be from about 2,000 psi to about 25,000 psi or higher. The crush strengths can be greater than 9,000 psi, greater than 12,000 psi, or greater than 15,000 psi. Other crush strengths below or above these ranges are possible. A crush strength below 3000 psi is an option, or 500 psi to 3000 psi, or 1000 psi to 2,000 psi. Crush strength can be measured, for example, either according to American Petroleum Institute Recommended Practice 60 (RP 60) or International Standard Organization's ISO 13503-2.

The proppant can have any particle size. For instance, the proppant can have an average particle diameter of from about 1 nm to 1 cm, from about 1 μm to about 1 mm, from about 10 μm to about 10 mm, from about 100 μm to about 5 mm, from about 50 μm to about 2 mm, or from about 80 μm to about 1,500 μm. The optimum size of the proppant can depend on the particular application.

The proppant can also have a range of particle size distributions such as from about 0.4 to about 1.0, wherein dps=(dp90−dp10)/dp50 and wherein dp10 is a particle size wherein 10% of the particles have a smaller particle size, dp50 is a median particle size wherein 50% of the particles have a smaller particle size, and dp90 is a particle size wherein 90% of the particles have a smaller particle size. The proppant may also exhibit a dps from about 0.4 to about 0.6, a dps of 0.1 to 0.6 or 0.1 to 0.4. The percent for particle size is based on number or amount.

The present invention also relates to a proppant used to prop open subterranean formation fractions comprising a particle or particles with controlled buoyancy and/or crush strength and/or surface properties and/or fine creation with particle crushing. The controlled buoyancy can be a negative buoyancy, a neutral buoyancy, or a positive buoyancy in the medium chosen for pumping the proppant to its desired location in the subterranean formation. The medium chosen for pumping the proppant can be any desired medium capable of transporting the proppant to its desired location including, but not limited to, a gas and/or liquid, energized fluid, foam, and aqueous solutions, such as water, brine solutions, and/or synthetic solutions. Any of the proppants of the present invention can have a crush strength sufficient for serving as a proppant to prop open subterranean formation fractures.

The proppants of the present invention can comprise a single particle or multiple particles and can be a solid, partially hollow, or completely hollow in the interior of the particle. The particle can be spherical, nearly spherical, oblong (or any combination thereof), or have other shapes suitable for purposes of being a proppant. The surface of the proppant can be smooth, rough, or can have protruding structures (including whiskers), or these features in any combination. The proppant may contain filler in addition to the whiskers. The filler is a compound that does not reactively sinter with the ceramic, glass, glass-ceramics, or composites. Examples of fillers include graphite, metals (e.g., noble metals), metal oxides (e.g., cerium oxide), and metal sulfides (e.g., molybdenum disulfide).

The proppant can be spherical, oblong, nearly spherical, or any other shapes. For instance, the proppant can be spherical and have a Krumbein sphericity of at least about 0.5, at least 0.6, at least 0.7, at least 0.8, or at least 0.9, and/or a roundness of at least about 0.4, at least 0.5, at least 0.6, at least 0.7, or at least 0.9. The term "spherical" refers to sphericity and roundness on the Krumbein and Sloss Chart by visually grading 10 to 20 randomly selected particles.

As indicated, the ceramic, glass, glass-ceramics, or composites produced by the present invention can be considered a proppant or used as a proppant.

The proppant can have at least one of the following characteristics:
a. an overall diameter of from about 90 microns to about 2,000 microns;
b. a Krumbein sphericity of at least about 0.5 and a roundness of at least about 0.5;
c. a crush strength of about 1,000 psi or greater;
d. a specific gravity of from about 1.0 to about 3.5;
e. a porosity of from about 0% to about 60%;
All of a. through e. can be present, or any two, three, four, or five of the properties/characteristics can be present.

The proppants can be used in a method to prop open subterranean formation fractures and can involve introducing a proppant formulation that includes one or more proppants of the present invention, into the subterranean formation. The method can be for treating a subterranean producing zone penetrated by a well bore, and can include the steps of preparing or providing a treating fluid that includes a fluid, energized fluid, foam, or a gas carrier having the proppant of the present invention suspended therein, and pumping the treating fluid into the subterranean producing zone whereby the particles are deposited therein. The treating fluid can be a fracturing fluid and the proppant particles can be deposited in the fractures formed in the subterranean producing zone. The treating fluid can be a gravel packing fluid and the particles can be deposited in the well bore adjacent to the subterranean producing zone.

The present invention further relates to a matrix that includes a plurality of the proppants of the present invention and at least one solid matrix material in which the proppant is distributed.

The configuration of the glass-ceramic article being formed can take many shapes including a sphere, elliptical, doughnut shape, rectangular, or any shape necessary to fulfill a useful application. In the case of a sphere, the sphere can encapsulate a template. The template may be a hollow or solid, and may be a glassy or glass-ceramic sphere, or an organic sphere. Hollow spheres are typically used as templates in applications where it is desirable to produce particles with low specific gravity. Spheres with an overall diameter from about 90 μm to about 2000 μm are typical for proppants (e.g., 100 μm to about 2000 μm, 120 μm to about 2000 μm).

In the case of spherical glass-ceramic composite particles including a hollow template, the composition of the outer shell preferably has a coefficient of thermal expansion matching that of the template. If the expansion of the inner and outer shells is significantly different, cracks may form at the interface between the inner and outer shell and strength of the resulting particle is negatively affected.

The present invention includes the following aspects/embodiments/features in any order and/or in any combination:
1. The present invention relates to a method for producing a proppant comprising the steps of:
   a. forming one or more green body materials comprising sacrificial materials, reactive materials, riders, pore formers, flow agents, or any combination thereof, and
   b. extruding said one or more green body materials to form a green body extrudate, and
   c. separating and shaping said green body extrudate into individual green bodies, and
   d. sintering said green bodies.
2. The method of any preceding or following embodiment/feature/aspect, wherein said sacrificial material comprises one or more polymers.
3. The method of any preceding or following embodiment/feature/aspect, wherein said sacrificial material comprises low-ash, combustible materials.
4. The method of any preceding or following embodiment/feature/aspect, wherein said sacrificial material comprises materials that are solid at room temperature and have a boiling point below a temperature of said sintering.
5. The method of any preceding or following embodiment/feature/aspect, wherein said reactive materials comprise alumina, silica, glass, clay, feldspar, metal oxides, silicon carbide, metals, mullite, bauxite, cordierite, metal carbide, metal nitride, metal boride, metal silicide, or any combination thereof.
6. The method of any preceding or following embodiment/feature/aspect, wherein said reactive materials comprise silica, alumina, magnesium oxide, iron oxide, carbon, or rice hulls or any combination thereof that are capable of reacting to produce fibers or whiskers.
7. The method of any preceding or following embodiment/feature/aspect, wherein said reactive materials comprise perlite, vermiculite, volcanic glasses, or other glassy materials that contain chemically or physically bound water or other vaporizable material.
8. The method of any preceding or following embodiment/feature/aspect, wherein said reactive materials comprise nephaline syenite or other fluxing materials that are capable of forming interfaces between glass, glass-ceramic, and ceramic materials in said sintered green body.

9. The method of any preceding or following embodiment/feature/aspect, wherein said riders comprise alumina, silica, glass, clay, feldspar, a metal oxide other than alumina, silicon carbide, metal, mullite, bauxite, cordierite, metal carbide, metal nitride, metal boride, metal silicide, or any combination thereof.

10. The method of any preceding or following embodiment/feature/aspect, wherein said pore formers comprise silicon carbide, silicon nitride, boron nitride, titanium carbide, titanium boride, aluminum nitride, sialon, aluminum oxynitride, or any combination thereof.

11. The method of any preceding or following embodiment/feature/aspect, wherein said flow agents comprise fumed silica, silicone, lubricant, gel, oil, water, surfactant, or any combination thereof.

12. The method of any preceding or following embodiment/feature/aspect, wherein said extruding comprises a flow or material movement of one or more green body materials and pressure or force is delivered to an extrusion chamber, wherein said one or more green body materials form said green body extrudate.

13. The method of any preceding or following embodiment/feature/aspect, wherein said flow or material movement of one or more green body materials and pressure or force is supplied by gravity, a rotating screw, twin rotating screw, a shear-driven method that integrate a mixing function with desired material movement, a piston, a ram, peristalsis, vibration, centrifugal force, or any combination thereof.

14. The method of any preceding or following embodiment/feature/aspect, wherein said twin screws are co-rotating or counter-rotating.

15. The method of any preceding or following embodiment/feature/aspect, wherein said extrusion chamber comprises a volume where a plurality of green body materials flow or move together in substantially the same direction.

16. The method of any preceding or following embodiment/feature/aspect, wherein said volume can be circular, oval, square, hexagonal, or another shape.

17. The method of any preceding or following embodiment/feature/aspect, wherein said flow or material movement of one or more green body materials can be concentric, parallel, offset, or another arrangement.

18. The method of any preceding or following embodiment/feature/aspect, wherein said flow or material movement of one or more green body materials can be constant, discontinuous, reversing, periodic, or otherwise varying with time.

19. The method of any preceding or following embodiment/feature/aspect, wherein said flow or material movement comprises two or more green body materials that are the same or different.

20. The method of any preceding or following embodiment/feature/aspect, wherein said extrusion chamber includes at least one volume for each green body material, wherein only said green body material is stored, flows, or moves.

21. The method of any preceding or following embodiment/feature/aspect, wherein said at least one volume is shaped to direct the flow or movement of each green body material toward another green body material, in parallel to other green body materials or any combination thereof.

22. The method of any preceding or following embodiment/feature/aspect, wherein the composition of said green body materials within any one or more of the said volumes of said extrusion chamber vary with time.

23. The method of any preceding or following embodiment/feature/aspect, wherein the cross section of said extrudate is circular, triangular, square, rectangular, or any other geometric shape.

24. The method of any preceding or following embodiment/feature/aspect, wherein the size of the cross section of said extrudate varies with time.

25. The method of any preceding or following embodiment/feature/aspect, wherein the variation of the extrudate cross section contributes to the separation of green bodies.

26. The method of any preceding or following embodiment/feature/aspect, wherein the variation of the extrudate cross section contributes to the shaping of the green bodies.

27. The method of any preceding or following embodiment/feature/aspect, wherein said separating is performed at least partially by a blade, edge, or other mechanical device brought into contact with the flow or movement of extrudate.

28. The method of any preceding or following embodiment/feature/aspect, wherein said separating is performed at least partially by a roller, belt or other means of contacting the flow or movement of extrudate.

29. The method of any preceding or following embodiment/feature/aspect, wherein said separating is performed at least partially by pulses, varying flow, or continuous flow of air, water, or another fluid.

30. The method of any preceding or following embodiment/feature/aspect, wherein said separating is performed at least partially by changes in the flow or movement of said green body materials through said extruder.

31. The method of any preceding or following embodiment/feature/aspect, wherein said separating is performed at least partially by vibration.

32. The method of any preceding or following embodiment/feature/aspect, wherein said separating is performed at least partially by solid surfaces with cavities or other structures brought into contact with the extrudate.

33. The method of any preceding or following embodiment/feature/aspect, wherein said contact of solid surfaces with extrudate contributes to the shaping of the green bodies.

34. The method of any preceding or following embodiment/feature/aspect, wherein said separating is performed by co-rotating wheels comprising a solid surface and cavities or other structures to effect said separation at least partially.

35. The method of any preceding or following embodiment/feature/aspect, wherein said shaping is performed by tumbling, rolling, grinding, milling, casting, die pressing, die forging, impingement, sand blasting, partial dissolving, or any combination thereof.

36. The method of any preceding or following embodiment/feature/aspect, wherein said shaping is performed by co-rotating wheels or other surfaces comprising a solid surface and cavities or other structures to alter the shape of said green body.

37. The method of any preceding or following embodiment/feature/aspect, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace or any combination thereof.

38. An apparatus for producing a proppant comprising
   a. a means for forming an intimate mixture of one or more green body materials, and
   b. a means to produce a green body extrudate, and
   c. a means for separating and shaping said green body extrudate into individual green bodies, and
   d. a means to sinter said green bodies.

39. The apparatus of any preceding or following embodiment/feature/aspect, wherein said means to produce a green body extrudate comprises a flow or material movement of one or more green body materials and pressure or force delivered to an extrusion chamber wherein said one or more green body materials form said green body extrudate.

40. The apparatus of any preceding or following embodiment/feature/aspect, wherein said flow or material movement of one or more green body materials and pressure or force is supplied by gravity, a rotating screw, twin rotating screws, shear-driven methods that integrate a mixing function with desired material movement, a piston, a ram, peristalsis, vibration, centrifugal forces, or any combination thereof.

41. The apparatus of any preceding or following embodiment/feature/aspect, wherein said twin rotating screws are co-rotating or counter-rotating.

42. The apparatus of any preceding or following embodiment/feature/aspect, wherein said extrusion chamber comprises a volume where a plurality of green body materials flow or move together in substantially the same direction.

43. The apparatus of any preceding or following embodiment/feature/aspect, wherein said volume can be circular, oval, square, hexagonal or another shape.

44. The apparatus of any preceding or following embodiment/feature/aspect, wherein the flow or material movement of two or more green body materials can be concentric, parallel, offset, or another arrangement.

45. The apparatus of any preceding or following embodiment/feature/aspect, wherein said flow or material movement of two or more green body materials can be constant, discontinuous, reversing, periodic, or otherwise varying with time.

46. The apparatus of any preceding or following embodiment/feature/aspect, wherein the flow or material movement of each of two or more green body materials can be the same or different.

47. The apparatus of any preceding or following embodiment/feature/aspect, wherein said extrusion chamber includes at least one volume for each green body material wherein only said green body material, is stored, flows or moves.

48. The apparatus of any preceding or following embodiment/feature/aspect, wherein said at least one volume can be shaped to direct the flow or movement of each green body material toward another green body material, in parallel to other green body materials or any combination thereof.

49. The apparatus of any preceding or following embodiment/feature/aspect, wherein the cross section of said extrudate can be circular, triangular, square, rectangular, or any other geometric shape.

50. The apparatus of any preceding or following embodiment/feature/aspect, wherein said separating is performed at least partially by a blade, edge, or other mechanical device brought into contact with the flow or movement of extrudate.

51. The apparatus of any preceding or following embodiment/feature/aspect, wherein said separating is performed at least partially by a roller, belt or other means of contacting the flow or movement of extrudate.

52. The apparatus of any preceding or following embodiment/feature/aspect, wherein said separating is performed at least partially by pulses, varying flow or continuous flow of air, water, or another fluid.

53. The apparatus of any preceding or following embodiment/feature/aspect, wherein said separating is performed at least partially by changes in the flow or movement of said green body materials through said extruder.

54. The apparatus of any preceding or following embodiment/feature/aspect, wherein said separating is performed at least partially by vibration applied to any of the methods of performing said separation.

55. The apparatus of any preceding or following embodiment/feature/aspect, wherein said separating is performed at least partially by solid surfaces with cavities or other structures brought into contact with the extrudate.

56. The apparatus of any preceding or following embodiment/feature/aspect, wherein said contact of solid surfaces with extrudate contributes to the shaping of the green bodies.

57. The apparatus of any preceding or following embodiment/feature/aspect, wherein said separating is performed by co-rotating wheels or other surfaces comprising a solid surface and cavities or other structures to effect said separation at least partially.

58. The apparatus of any preceding or following embodiment/feature/aspect, wherein said shaping is performed by tumbling, rolling, grinding, milling, casting, die pressing, die forging, impingement, sand blasting, partial dissolving, and the like or any combination thereof.

59. The apparatus of any preceding or following embodiment/feature/aspect, wherein said shaping is performed by co-rotating wheels or other surfaces comprising a solid surface and cavities or other structures to alter the shape of said green body.

60. The apparatus of any preceding or following embodiment/feature/aspect, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace, or any combination thereof.

61. A proppant produced by the method of any preceding or following embodiment/feature/aspect.

62. The method of any preceding or following embodiment/feature/aspect, wherein said one or more polymers is polystyrene, polyethylene, polycarbonate, and/or other polymers that are soluble in organic solvents, such as toluene and/or xylene.

63. The method of any preceding or following embodiment/feature/aspect, wherein said sacrificial material is starch, coke (petroleum or metallurgical), carbon, sugar, wood, plant spores, and/or bacteria.

64. The method of any preceding or following embodiment/feature/aspect, wherein said sacrificial material is water, wax, or oil.

65. A method of forming a proppant, comprising:
   forcing at least one slurry paste under pressure through an extrusion die to form a green body extrudate;
   sectioning the green body extrudate into predetermined lengths to form sectional green bodies by crimping so as to have sealed ends for each sectional green body.

66. The method of any preceding or following embodiment/feature/aspect, further comprising rounding off the sectional green bodies.
67. The method of any preceding or following embodiment/feature/aspect, wherein the green body extrudate comprises a hollow cylindrical tube.
68. The method of any preceding or following embodiment/feature/aspect, wherein the rounding off comprising tumbling the sectional green bodies.
69. A system for forming a proppant, comprising:
   an extrusion die through which a slurry paste is forced under pressure to form a green body extrudate;
   at least one crimper for sectioning the green body extrudate into predetermined lengths to form sectional green bodies by crimping so as to have sealed conical or hemispherical ends; and
   a tumbler device for rounding off the ends of the sectional green bodies.
70. The system of any preceding or following embodiment/feature/aspect, wherein the tumbler device is a spheronizer.
71. The method of any preceding or following embodiment/feature/aspect, wherein the green body extrudate comprises a core and at least one layer encapsulating or surrounding said core.
72. The method of any preceding or following embodiment/feature/aspect, wherein said separating comprises crimping said green body extrudate so as to form sealed ends of the individual green bodies, such that the sealed ends have the same outer consistency as the rest of the outer surface area of the individual green bodies.
73. The method of any preceding or following embodiment/feature/aspect, wherein said extruding comprises two or more green body materials that form the green body extrudate, such that the green body extrudate comprises a core and at least one layer that encapsulates or surrounds the core.
74. The method of any preceding or following embodiment/feature/aspect, wherein said two or more green body materials have viscosities when being extruded such that the green body material forming the core has a higher viscosity than the green body material forming a layer that surrounds said core.
75. The method of any preceding or following embodiment/feature/aspect, wherein said two or more green body materials have viscosities when being extruded such that the green body material forming the core has a higher viscosity than the green body material forming a layer that surround said core, and wherein any two or more layers are present around said core, and wherein the layer closer to said core has a higher viscosity than the outer layer further away from the core.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1 (Theoretical Example)

A ceramic powder mixture of aluminosilicate glass and alumina with a mean particle size of approximately 1.50±0.05 µm is charged into the muller of the extruder. To the powder is added 50.0±0.5 g of oleic acid as an extrusion lubricant. The resulting mixture is mulled for approximately 5 minutes, after which time 250±0.5 g of methyl cellulose is added to act as a binder. Mulling of the powder/lubricant/binder is continued for 10 minutes, after which time a quantity of water is added to wet out the powder and form a paste suitable for extrusion. The quantity of water added is typically 500±1 g. The paste is mulled for an additional 20 minutes under vacuum to de-gas the paste prior to extrusion. The paste is moved from the reservoir to the extrusion die by way of a twin screw feeder. The extrusion die has multiple circular apertures of approximately 915 µm. The paste extrudes from the die set and forms a continuous extrudate of circular cross-section with a mean diameter of approximately 915 µm. The extrudate is cut into lengths of 915 µm by way of a vertical cutting blade. The resulting cut extrudates are charged into the product chamber of an Eirich mixer to effect spheronization of the cylindrical extrudates. The pan is rotated clockwise at approximately 25 rpm with the rotor of the machine running in a counter clockwise direction at approximately 100 rpm. The process is continued until the extrudates are spherical. The now spherical extrudates are removed from the pan on the mixer and sintered in air under standard conditions (e.g., 800° C. to 1,200° C. for 10-60 minutes) to obtain a proppant of approximately 750 µm (US Mesh #20) diameter.

Example 2 (Theoretical Example)

The paste of the same composition (and additives) as in Example 1 is prepared and is extruded through a modified die. The modified die has circular apertures with a circular mandrel of 250 µm diameter centered in each aperture of the die. The extrudate thus formed is tubular in nature with an inside diameter of approximately 250 µm and an outside diameter of approximately 915 µm. The resulting tubular extrudate is cut into lengths of 915 µm by way of a crimping action using a tool with a conical profile. The resulting crimped extrudate sections are processed in the Eirich mixer and sintered as in Example 1, yielding hollow proppant spheres of approximately 750 µm (US Mesh #20) diameter.

Example 3 (Theoretical Example)

A ceramic polymer mixture of composition 80 vol % ceramic powder mixture with the composition of Example 1 and 20 vol % low density polyethylene is mixed in the muller for 10 minutes. The resulting ceramic-polymer mixture is heated to approximately 115° C. and mulling continued for approximately 15 minutes to melt and mix the two components together into a homogenous mix. The resulting ceramic-polymer blend is extruded through the same die as used in Example 1 and the extrudate is maintained at a temperature of approximately 75° C. and cut into lengths of 915 µm using a planar cutting blade. The cut extrudates are placed into a heated forging die of two pieces with hemispherical cavities. The forging die is maintained at approximately 100° C. The extrudates are oriented such that the axial direction of the cylindrical extrudates are perpendicular to the face of the forging die. The cylindrical extrudates are forged to spheres with a diameter of 915 µm. Heat treatment and sintering (as in Example 1) of the resulting spheres will yield a solid ceramic proppant of approximately 750 µm (US Mesh #20) diameter.

Example 4 (Theoretical Example)

The ceramic-polymer blend of Example 3 is extruded through an extrusion die with mandrels as per the die set used in Example 2. The tubular extrudates are crimped in a manner similar to that of Example 2. The short lengths of tubular extrudates with crimped ends are forged into hollow spheres, using the forging die of Example 3, with an outside diameter of approximately 915 µm and an inside diameter of approximately 250 µm. Heat treatment and sintering (as in Example 1) of the hollow ceramic-polymer spheres will yield a hollow ceramic proppant of approximately 750 µm (US Mesh #20) diameter.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An apparatus for producing a proppant comprising
    a. an extrusion chamber wherein, the extrusion chamber comprises a plurality of staggered inlets such that the extrusion chamber is capable of producing a layered green body extrudate;
    b. a means for separating and shaping the layered green body extrudate into individual green bodies, and
    c. a means to sinter said green bodies.

2. The apparatus of claim 1, wherein the extrusion chamber comprises a flow or material movement of one or more green body materials and pressure or force delivered to the extrusion chamber wherein the one or more green body materials form the layered green body extrudate.

3. The apparatus of claim 2, wherein said flow or material movement of one or more green body materials and pressure or force is supplied by gravity, a rotating screw, twin rotating screws, shear-driven methods that integrate a mixing function with desired material movement, a piston, a ram, peristalsis, vibration, centrifugal forces, or any combination thereof.

4. The apparatus of claim 3, wherein said twin rotating screws are co-rotating or counter-rotating.

5. The apparatus of claim 2, wherein said extrusion chamber comprises a volume where a plurality of green body materials flow or move together in substantially the same direction.

6. The apparatus of claim 5, wherein said volume is circular, oval, square, or hexagonal.

7. The apparatus of claim 2, wherein the flow or material movement of two or more green body materials is concentric, parallel, or offset.

8. The apparatus of claim 2, wherein said flow or material movement of two or more green body materials is constant, discontinuous, reversing, or periodic.

9. The apparatus of claim 2, wherein the flow or material movement of each of two or more green body materials is the same or different.

10. The apparatus of claim 2, wherein the plurality of staggered inlets contains one green body material per staggered inlet, and wherein the green body material, is stored, flows or moves within the staggered inlet.

11. The apparatus of claim 10, wherein the staggered inlets can be shaped to direct the flow or movement of each green body material toward another green body material, in parallel to other green body materials or any combination thereof.

12. The apparatus of claim 1, wherein the cross section of the individual green bodies is circular, triangular, square, or rectangular.

13. The apparatus of claim 1, wherein said separating is performed at least partially by a blade, or edge brought into contact with the flow or movement of the layered green body extrudate.

14. The apparatus of claim 1, wherein said separating is performed at least partially by a roller, or belt or other means of contacting the flow or movement of the layered green body extrudate.

15. The apparatus of claim 1, wherein said separating is performed at least partially by pulses, varying flow or continuous flow of air, water, or another fluid.

16. The apparatus of claim 1, wherein said separating is performed at least partially by changes in the flow or movement of said green body materials through the extrusion chamber.

17. The apparatus of claim 1, wherein said separating is performed at least partially by vibration applied to any of the methods of performing said separation.

18. The apparatus of claim 1, wherein said separating is performed at least partially by solid surfaces with cavities or other structures brought into contact with the extrudate.

19. The apparatus of claim 18, wherein said contact of solid surfaces with extrudate contributes to the shaping of the green bodies.

20. The apparatus of claim 1, wherein said separating is performed by co-rotating wheels or other surfaces comprising a solid surface and cavities or other structures to effect said separation at least partially.

21. The apparatus of claim 1, wherein said shaping is performed by tumbling, rolling, grinding, milling, casting, die pressing, die forging, impingement, sand blasting, partial dissolving, and the like or any combination thereof.

22. The apparatus of claim 1, wherein said shaping is performed by co-rotating wheels or other surfaces comprising a solid surface and cavities or other structures to alter the shape of the layered green body extrudate.

23. The apparatus of claim 1, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace, or any combination thereof.

24. A method of forming a proppant, comprising:
    a. forcing at least two or more slurry pastes under pressure through an extrusion chamber comprising a plurality of staggered inlets to form a layered green body extrudate;
    b. sectioning the layered green body extrudate into predetermined lengths through localized compression to form sectional green bodies having sealed ends preventing cross-sectional area exposure for each sectional green body.

25. The method of claim 24, further comprising rounding off the sectional green bodies.

26. The method of claim 25, wherein the rounding off comprising tumbling the sectional green bodies.

27. The method of claim 24, wherein the layered green body extrudate comprises a hollow cylindrical tube.

* * * * *